United States Patent Office 3,528,293
Patented Sept. 15, 1970

3,528,293
THERMISTOR TEMPERATURE COMPENSATOR
William Brandau, Westwood, and Peter van der Sluys, Wayne, N.J., assignors to The Bendix Corporation, a corporation of Delaware
Filed Feb. 29, 1968, Ser. No. 709,475
Int. Cl. G01i 7/12
U.S. Cl. 73—386                                       15 Claims

ABSTRACT OF THE DISCLOSURE

A temperature compensated device for measuring a condition has a servo controlled by signals corresponding to the condition and operates a potentiometer providing predetermined correction voltages, at discrete values of the condition, corresponding to temperature corrections required for those values at low temperatures and interpolating correction voltages between the discrete values. A temperature sensitive bridge attenuates the correction voltages in accordance with the correction required at increased temperature. The correction voltages are used to correct the condition signals for variations due to temperature.

BACKGROUND OF THE INVENTION

Field of the invention

The invention relates to the field of temperature compensation and more particularly to temperature compensation where the compensating voltage may vary both in magnitude and in direction at discrete percentages of overall transducer range.

Description of the prior art

In the past, for example in free displacement diaphragm altimeters, it has been standard practice to utilize one bimetallic temperature sensitive element to control the range arm length plus a second similar element to control the zero set point to prevent the altimeter from generating excessive scale errors with extreme changes in environmental temperature. Normally when the aforenoted elements are adjusted to a "best average" setting, a critical calibration will reveal that temperature induced scale errors still exist at various points over the range of the device. Further adjustments of the bimetal elements to correct these residual errors could only be accomplished at the cost of losing accuracy in presently acceptable areas. In a typical altimeter the bimetallic elements successfully reduced temperature errors over the entire altitude range at both room and hot temperatures; however, at low temperatures unacceptable errors remained at certain altitudes while at other altitudes there would be no error.

In order to overcome this problem, a multiple-tap interpolating potentiometer using predetermined voltages of opposite phases from an excitation transformer excites a temperature sensitive thermistor bridge, the output of which is applied to the sensor servo system to provide the necessary correction.

SUMMARY OF THE INVENTION

A low temperature compensator utilizing a temperature sensitive thermistor bridge excited by predetermined voltages of opposite phases from an excitation source through a multitap interpolating potentiometer. The output of the thermistor bridge is fed into servo system controlled by condition signals to provide corrections for different values of the condition.

DESCRIPTION OF THE PREFERRED EMBODIMENTS

Figure 1:
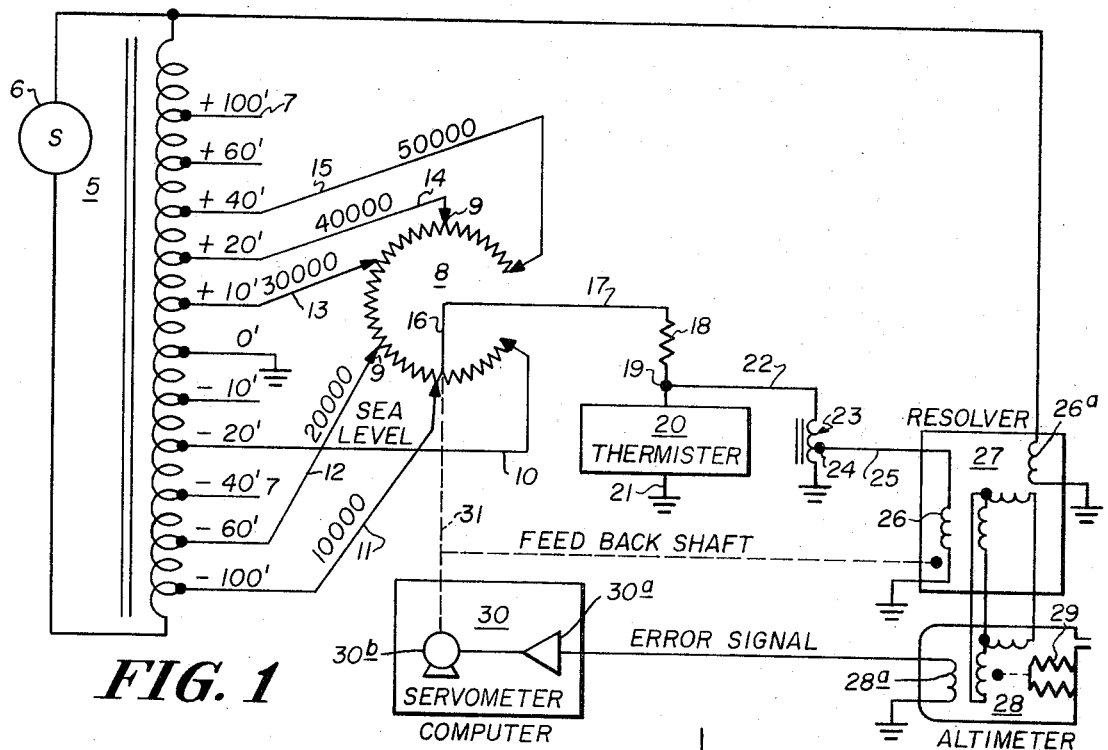
FIG. 1 is an altimeter schematic diagram of a system embodying the invention.

Referring now to FIG. 1 of the drawings, an autotransformer 5 has its input connected to a suitable source of A.C. voltage 6. The transformer 5 has taps 7 to give a choice of voltages corresponding to altitude corrections from minus 100 feet to plus 100 feet in 10 discrete amounts.

A multitap interpolating potentiometer 8 has a plurality of taps 9, each representing a discrete altitude, for example six taps for sea level to 50,000 feet in 10,000 feet steps. The taps 9 are connected by respective conductors 10, 11, 12, 13, 14 and 15 to predetermined taps 7 of the transformer 5 to make a predetermined correction for each of these altitudes. For example, the conductor 10 is connected from the tap 9 on the potentiometer 8, which represents sea level, to the —20 feet correction tap 7 of the transformer 5. The conductor 11 connects the tap 9, which represents 10,000 feet, to the —100 feet correction tap 7 of the transformer 5. In like manner, the conductors 12, 13, 14 and 15 connect the respective taps 9 representing 20,000 feet, 30,000 feet, 40,000 feet and 50,000 feet to correction taps —60, +10, +20 and +40 of the transformer 5. While the aforenoted connections are shown by way of example, it is understood that other combinations of connections may be made to make the necessary altitude corrections as will be explained later.

The potentiometer 8 has a movable slider 16 which is connected by conductor 17 to one end of a resistor 18. The other end of resistor 18 is connected by a conductor 19 to one end of a thermistor 20, the other side of which is connected to ground by a conductor 21. Resistor 18 and thermistor 20 form a thermistor bridge for attenuating a voltage applied thereto. Conductor 19 is connected by a conductor 22 to one end of an impedance matching transformer 23 which has a second end connected to ground.

The transformer 23 has a tap 24 which is connected by a conductor 25 to a compensating rotor winding 26 of a follow-up resolver 27 which has a second rotor winding 26ª energized by alternating current source 6. Compensating rotor winding 26 is connected to ground in parallel with thermistor 20 and transformer 23. A resolver 28 is connected back to back to resolver 27 and has a rotor winding 28ª driven by an altitude sensor 29 and supplies an error signal to a computer 30 including an amplifier 30ª and a servomotor 30ᵇ where it is amplified and caused to drive the servomotor. The servomotor is drivably connected to windings 26 and 26ª of resolver 27 and rotates the windings in a direction to null the error signal. The movable slider 16 is connected by a shaft, indicated by dashed line 31, for actuation by servomotor 30ᵇ to move the slider 16 in accordance with altitude.

Figure 2:
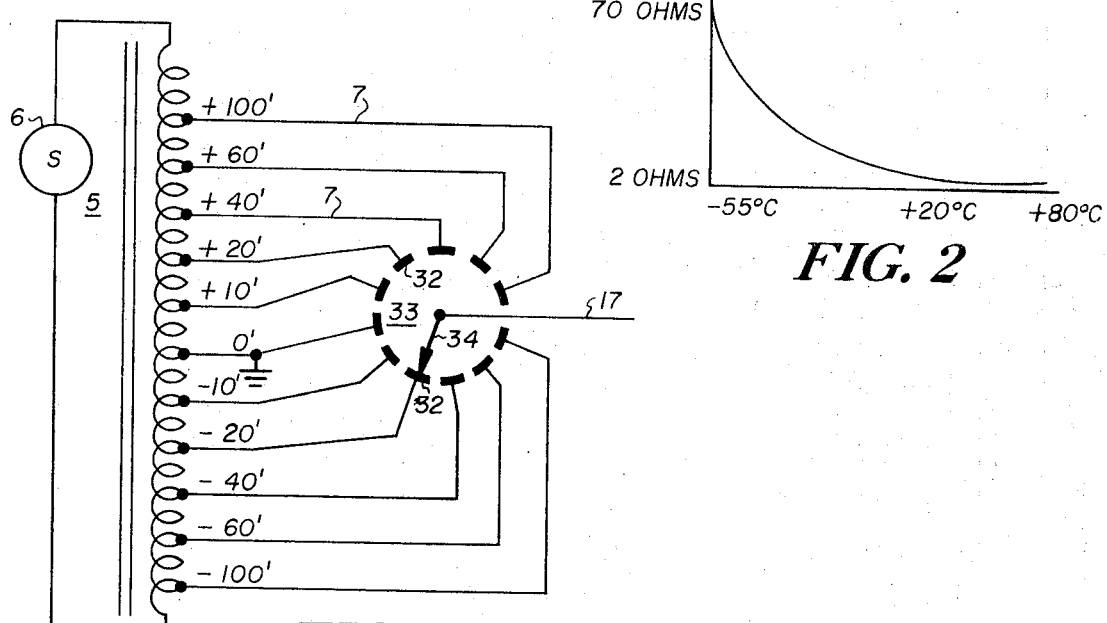
FIG. 2 is a curve illustrating the temperature characteristic of a thermistor used in the system of FIG. 1.

FIG. 2 is a curve illustrating the change in resistance for a typical thermistor with temperature. It is noted that the change is negligible above +20° C. and at a maximum at —55° C.

Figure 3:
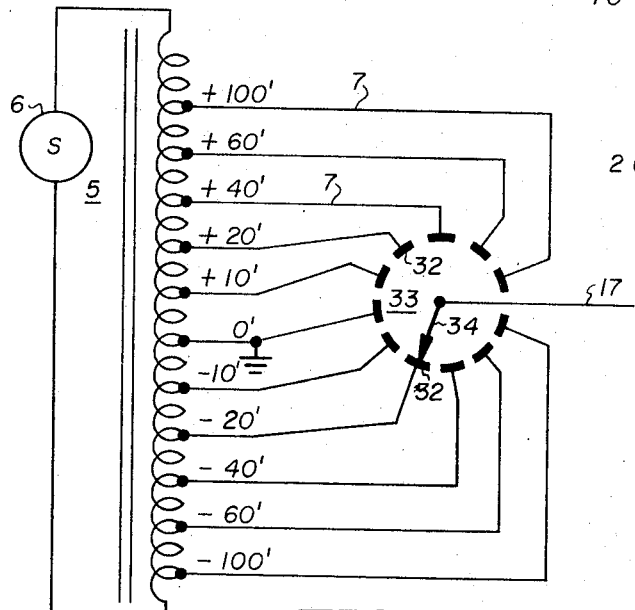
FIG. 3 is a schematic diagram of a device for selecting predetermined voltages for the system of FIG. 1.

In order to determine the correct tap connections, reference is now made to FIG. 3 where only the difference from FIG. 1 is illustrated in detail.

After the bimetal hot temperature compensation has been hardened and finalized, the system is placed in a chamber in which pressure and temperature can be controlled. The taps 7 of a transformer 5 are connected to stationary contacts 32 of a multiple contact switch 33.

The switch 33 has a movable contact 34 which is adapted to scan the contacts 32 and is connected to the conductor 17. The temperature is reduced to −55 and maintained at that point. The pressure is then adjusted to provide pressures from sea level to 50,000 feet in 10,000 feet intervals. At each 10,000 foot level, the movable contact member 34 is rotated to scan the taps 7 of the transformer 5 through contacts 32. The tap which gives zero error is noted on a log sheet. After each level has been scanned and the proper taps noted, the temperature is raised to room level and the six selected taps of transformer 5 are connected to the appropriate taps on the interpolating potentiometer 8.

In the operation, the multitap interpolating potentiometer excites the temperature sensitive thermistor bridge, the output of which varies with temperature and is applied to winding 26 of resolver 27 through transformer 23 to provide the proper correction voltages at the discrete altitudes. The potentiometer provides continuous voltage interpolation between the discrete altitudes to provide a continuous correction.

The effect of the excitation on winding 26 is to rotate the magnetic field in resolver 27 by adding a component perpendicular to the field provided by winding $26^a$. The rotation of the magnetic field is transmitted to resolver 28 through the back to back stator connections and produces a like rotation of the magnetic field of resolver 28 to compensate for scale errors in altimeter 29 caused by low temperatures. With this arrangement the servo system provides a proper altitude output over the entire range and at all temperatures.

The required correction may vary both in magnitude and in direction at various altitudes. The system can supply all possible combinations by the one-shot nature of the adjustment. Inasmuch as the thermistor bridge output is negligible above room temperature, automatic low temperature correction is achieved without switching.

The compensating voltage is applied to the compensating winding of the resolver. In order to prevent phase shift problems, a relatively high voltage level is applied to the thermistor and then stepped down to a working level, for example 5:1 which provides an impedance improvement of 25:1. This level is low enough to supply the requirements. In case the potentiometer movable contact fails, the open circuit will not increase the impedance at the resolver winding. The compensation will merely go to zero.

Although only one embodiment of the invention has been illustrated and described, various changes in the form and relative arrangement of the parts, which will now appear to those skilled in the art, may be made without departing from the scope of the invention.

What is claimed is:

1. A temperature compensating circuit for a sensor comprising a source of predetermined voltages, a potentiometer having a plurality of predetermined spaced taps and a movable contact, circuit means connecting said space taps to respective predetermined voltages, a thermistor, means connecting said thermistor to said movable contact, a sensor, means responsive to a condition of said sensor to actuate said movable contact to energize said thermistor in accordance with said condition, and means responsive to the energization of said thermistor to provide temperature compensation for said sensor.

2. The combination as set forth in claim 1 in which said source of predetermined voltage is a multitapped autotransformer.

3. The combination as set forth in claim 1 in which said thermistor is of a type having a high resistance at cold temperatures and low resistance at high temperatures.

4. The combination as set forth in claim 1 in which said sensor is an altimeter.

5. The combination as set forth in claim 1 in which said means responsive to said sensor are a resolver and computer.

6. The combination as set forth in claim 4 in which said voltages are selected to provide temperature compensation for predetermined altitudes.

7. The combination as set forth in claim 6 in which said voltage represents predetermined feet of correction.

8. A temperature compensated device for measuring a condition, comprising:
   means responsive to the condition for providing signals corresponding thereto, means for providing a plurality of predetermined correction voltages, means selectively connected to the last mentioned means for providing selected predetermined correction voltages corresponding to corrections required at discrete values of the condition, means for varying the predetermined correction voltages provided by the last mentioned means to compensate for temperature, and means connected to the last mentioned means and to the condition responsive means for correcting the condition signals for variations due to temperature.

9. A temperature compensated device for measuring a condition as described in claim 8 in which the means for providing selected predetermined correction voltages is controlled by the signals from the condition responsive means and interpolates the selected correction voltages between the discrete values of the condition.

10. A temperature compensated device for measuring a condition as described in claim 9, in which the means for providing selected predetermined correction voltages includes a potentiometer having a plurality of taps spaced to correspond to the discrete values of the condition for receiving the corresponding selected predetermined correction voltages to provide the selected predetermined correction voltages at the discrete values of the condition and to interpolate the correction voltages between the discrete values.

11. A temperature compensated device for measuring a condition as described in claim 10 in which the potentiometer has a contact movable in accordance with the condition.

12. A temperature compensated device for measuring a condition as described in claim 8, in which the means for varying the selected predetermined correction voltages includes a thermistor.

13. A temperature compensated device for measuring a condition as described in claim 12, in which the thermistor is connected in parallel with the condition signal correcting means to compensate over a low temperature range.

14. A temperature compensated device for measuring a condition as described in claim 8 in which the means responsive to the condition for providing signals corresponding thereto includes a pair of resolvers connected back to back and a servomotor, one of the resolvers being controlled by condition sensing means, and the other resolver being drivably connected to the servo motor.

15. A temperature compensated device for measuring a condition as described in claim 14 in which the condition signal correcting means includes a compensating winding in one of the resolvers.

References Cited

UNITED STATES PATENTS

| | | | |
|---|---|---|---|
| 2,825,227 | 3/1958 | Sandberg | 73—386 |
| 3,301,062 | 1/1967 | Reesby et al. | 73—393 |

DONALD D. WOODIEL, Primary Examiner

U.S. Cl. X.R.

73—393